United States Patent
Ronk et al.

(10) Patent No.: US 7,178,654 B2
(45) Date of Patent: Feb. 20, 2007

(54) LOW POWER MODULATING CLUTCH CONTROL SYSTEM

(75) Inventors: Aaron Ronk, Lake George, NY (US); John D. Zalewski, Liverpool, NY (US); James S. Brissenden, Baldwinsville, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 220 days.

(21) Appl. No.: 10/931,589

(22) Filed: Sep. 1, 2004

(65) Prior Publication Data

US 2006/0042907 A1  Mar. 2, 2006

(51) Int. Cl.
*F16D 21/00* (2006.01)

(52) U.S. Cl. .................. 192/85 AA; 60/545; 91/433; 192/84.6

(58) Field of Classification Search .............. None
See application file for complete search history.

(56) References Cited

U.S. PATENT DOCUMENTS

| | | | |
|---|---|---|---|
| 4,862,769 A | 9/1989 | Koga et al. | |
| 4,895,236 A | 1/1990 | Sakakibara et al. | |
| 5,224,906 A | 7/1993 | Sturm | |
| 5,251,971 A * | 10/1993 | Reinartz et al. | 303/115.4 |
| 5,323,871 A | 6/1994 | Wilson et al. | |
| 5,332,060 A | 7/1994 | Sperduti et al. | |
| 5,407,024 A | 4/1995 | Watson et al. | |
| 5,695,037 A * | 12/1997 | Borschert et al. | 192/84.1 |
| 5,934,432 A * | 8/1999 | Bates | 192/85 C |
| 6,145,644 A | 11/2000 | Mohan et al. | |
| 6,354,977 B1 | 3/2002 | Brown et al. | |
| 6,446,774 B2 | 9/2002 | Porter | |
| 6,484,857 B2 | 11/2002 | Vonnegut et al. | |
| 6,578,654 B2 | 6/2003 | Porter | |
| 6,595,338 B2 | 7/2003 | Bansbach et al. | |
| 6,612,957 B2 | 9/2003 | Bansbach et al. | |
| 6,655,138 B2 | 12/2003 | Shaw et al. | |
| 6,679,565 B2 | 1/2004 | Riddiford | |
| 6,681,912 B2 * | 1/2004 | Suzuki et al. | 192/85 AA |
| 6,725,990 B2 | 4/2004 | Bowen | |
| 6,745,879 B1 | 6/2004 | Dolan | |
| 6,808,054 B2 * | 10/2004 | Hirt | 192/87.11 |
| 2006/0042906 A1 * | 3/2006 | Ronk et al. | 192/85 C |

FOREIGN PATENT DOCUMENTS

JP  2-18117  1/1990
JP  3066927  3/1991

* cited by examiner

*Primary Examiner*—Saul Rodriguez
(74) *Attorney, Agent, or Firm*—Harness, Dickey & Pierce, P.L.C.

(57) ABSTRACT

A power transmission device includes a rotary input member adapted to receive drive torque from a source of torque, a rotary output member adapted to provide drive torque to an output device and a torque transfer mechanism operable to transferring drive torque from the input member to the output member. The torque transfer mechanism includes a friction clutch assembly operably disposed between the input member and the output member and a hydraulic clutch actuation system operable for applying a clutch engagement force to the friction clutch assembly. The hydraulic clutch actuation system includes an electric motor drivingly coupled to a first piston. The first piston is slidably positioned within the housing for supplying pressurized fluid to an accumulator. The pressurized fluid within the accumulator is in communication with a second piston to provide the clutch engagement force.

20 Claims, 10 Drawing Sheets

LOW POWER MODULATING CLUTCH CONTROL SYSTEM

FIELD OF THE INVENTION

The present invention relates generally to power transfer systems operable for controlling the distribution of drive torque between a pair of rotary shafts and, more particularly, to clutch control systems operable to efficiently convert electrical energy to mechanical potential energy for subsequent actuation of a clutch.

BACKGROUND OF THE INVENTION

In view of increased consumer demand for four-wheel drive vehicles, a plethora of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. A mechanical mode shift mechanism can be selectively actuated by the vehicle operator for rigidly coupling the non-driven wheel to the driven wheels in order to establish a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the on-demand feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that the drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the normally non-driven wheels can be varied as a function of specific vehicle dynamics, as detected by the sensor arrangement.

Conventional clutch assemblies typically include a clutch pack operably connected between a drive member and a driven member. A power-operated actuator controls engagement of the clutch pack. Specifically, torque is transferred from the drive member to the driven member by actuating the power-operated actuator. The power-operated actuator displaces an apply plate which acts on the clutch pack and increases the frictional engagement between the interleaved plates.

A variety of power-operated actuators have been used in the art. Exemplary embodiments include those disclosed in U.S. Pat. No. 5,407,024 wherein a ball-ramp arrangement is used to displace the apply plate when a current is provided to an induction motor. Another example disclosed in U.S. Pat. No. 5,332,060, assigned to the assignee of the present application, includes a linear actuator that pivots a lever arm to regulate the frictional forces applied to the clutch pack. These types of systems are often equipped with motors that may require peak electrical currents greater than optimally desired to operate the clutch actuators. While the above actuator devices may perform adequately for their intended purpose, a need exists for an improved clutch actuation system that requires a relatively low, minimally fluctuating supply of electrical power for operation.

SUMMARY OF THE INVENTION

A power transmission device includes a rotary input member adapted to receive drive torque from a source of torque, a rotary output member adapted to provide drive torque to an output device and a torque transfer mechanism operable to transferring drive torque from the input member to the output member. The torque transfer mechanism includes a friction clutch assembly operably disposed between the input member and the output member and a hydraulic clutch actuation system operable for applying a clutch engagement force to the friction clutch assembly. The hydraulic clutch actuation system includes an electric motor drivingly coupled to a first piston. The first piston is slidably positioned within the housing for supplying pressurized fluid to an accumulator. The pressurized fluid within the accumulator is in communication with a second piston to provide the clutch engagement force.

BRIEF DESCRIPTION OF THE DRAWINGS

The present invention will become more fully understood from the detailed description given below, the appended claims, and the accompanying drawings in which:

DETAILED DESCRIPTION OF THE PREFERRED EMBODIMENT

In general, the present invention is directed to a power transfer system which is operably installed between the driven and non-driven wheels of a four-wheel drive vehicle.

In operation, the amount of drive torque transferred to the non-driven wheels is controllably regulated in accordance with various system and driver-initiated inputs for optimizing the tractive characteristics of the vehicle. In addition, the power transfer system may also include a mode select mechanism for permitting a vehicle operator to select between a two-drive wheel mode, a part-time four-wheel drive mode, and an "on-demand" drive mode. The power transfer system of the present invention includes a clutch control system for converting electrical energy to mechanical potential energy to alleviate exceedingly high peak electrical current requirements that may occur during vehicle operation.

Figure 1:
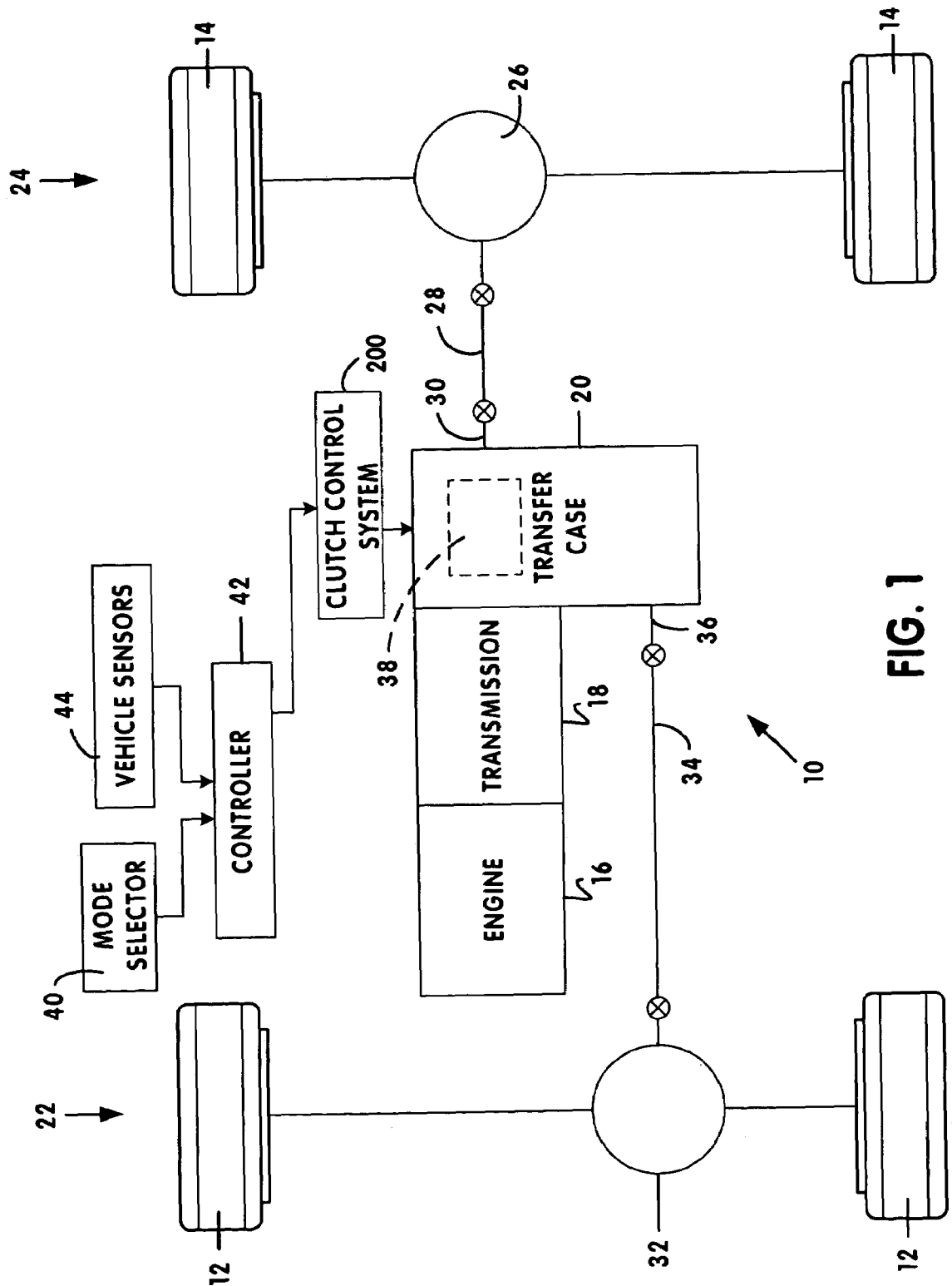
FIG. 1 is a schematic representation of an exemplary four-wheel drive vehicle having the clutch control systems of the present invention incorporated therein.

Referring to FIG. 1 of the drawings, a drivetrain for a four-wheel drive vehicle is schematically shown interactively associated with a power transfer system 10. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 (i.e., the "driven" wheels) in a two-wheel drive mode of operation. Front wheels 12 and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output shaft 30 of transfer case 20. Similarly, front axle assembly 22 includes a front differential 32 that is coupled to one end of a front drive shaft 34, the opposite end of which is coupled to a second output shaft 36 of transfer case 20. It is to be understood that the specific orientation of the drivetrain is merely exemplary in nature and that the drivetrain could be reversed for normally driving front wheels 12.

Transfer case 20 is equipped with a torque transfer clutch 38 for selectively delivering drive torque to front wheels 12 (i.e., the non-driven wheels) to establish a four-wheel drive mode of operation. The operating mode of transfer clutch 38 is generally controlled in response to a mode signal generated by a mode selector 40 and which is sent to a controller 42. Controller 42 also receives input signals from one or more vehicle sensors 44 that are indicative of various operational characteristic of the vehicle.

When the two-wheel drive mode is selected, all drive torque is delivered from first output shaft 30 to rear wheels 14 and transfer clutch 38 is maintained in a "non-actuated" condition. When the part-time four-wheel drive mode is selected, transfer clutch 38 is fully actuated and maintained in a "lock-up" condition such that second output shaft 36 is, in effect, rigidly coupled for driven rotation with first output shaft 30. When the "on-demand" drive mode is selected, controller 42 communicates with a clutch control system 200 to control the degree of actuation of transfer clutch 38 for varying the amount of drive torque directed to front wheels 12 through transfer clutch 38 as a function of the sensor input signals for providing improved tractive performance when needed. In addition, controller 42 is adapted to controllably modulate the actuated state of transfer clutch 38 as described in greater detail hereinafter. By way of example rather than limitation, the control scheme generally disclosed in U.S. Pat. No. 5,332,060 issued Jul. 26, 1994 to Sperduti et al. and assigned to the common assignee of the present invention (the disclosure of which is hereby incorporated by reference) can be used to control adaptive actuation of transfer clutch 38 during on-demand operation.

FIGS. 2–7 depict various clutch control systems for storing mechanical energy and reducing the maximum required electrical current for clutch actuation. The clutch control systems discussed below are an improvement over prior systems due to their ability to reduce peak power draw and overall power consumption from the vehicle's electrical system while operating the modulating clutch. The decrease in power draw is primarily accomplished by using a relatively low amount of electrical energy over time to charge a mechanical energy storage device and releasing the energy rapidly when required. This control scheme makes it possible to reduce the size of vehicle electrical system including the wires and circuitry controlling the electrical system. Each of the clutch control systems described below provides for operating a modulating clutch or clutches. The controls for the modulating clutches utilize available vehicle information along with hydraulic system information to react to a vehicle command to provide the required torque and/or speed.

Figure 2:
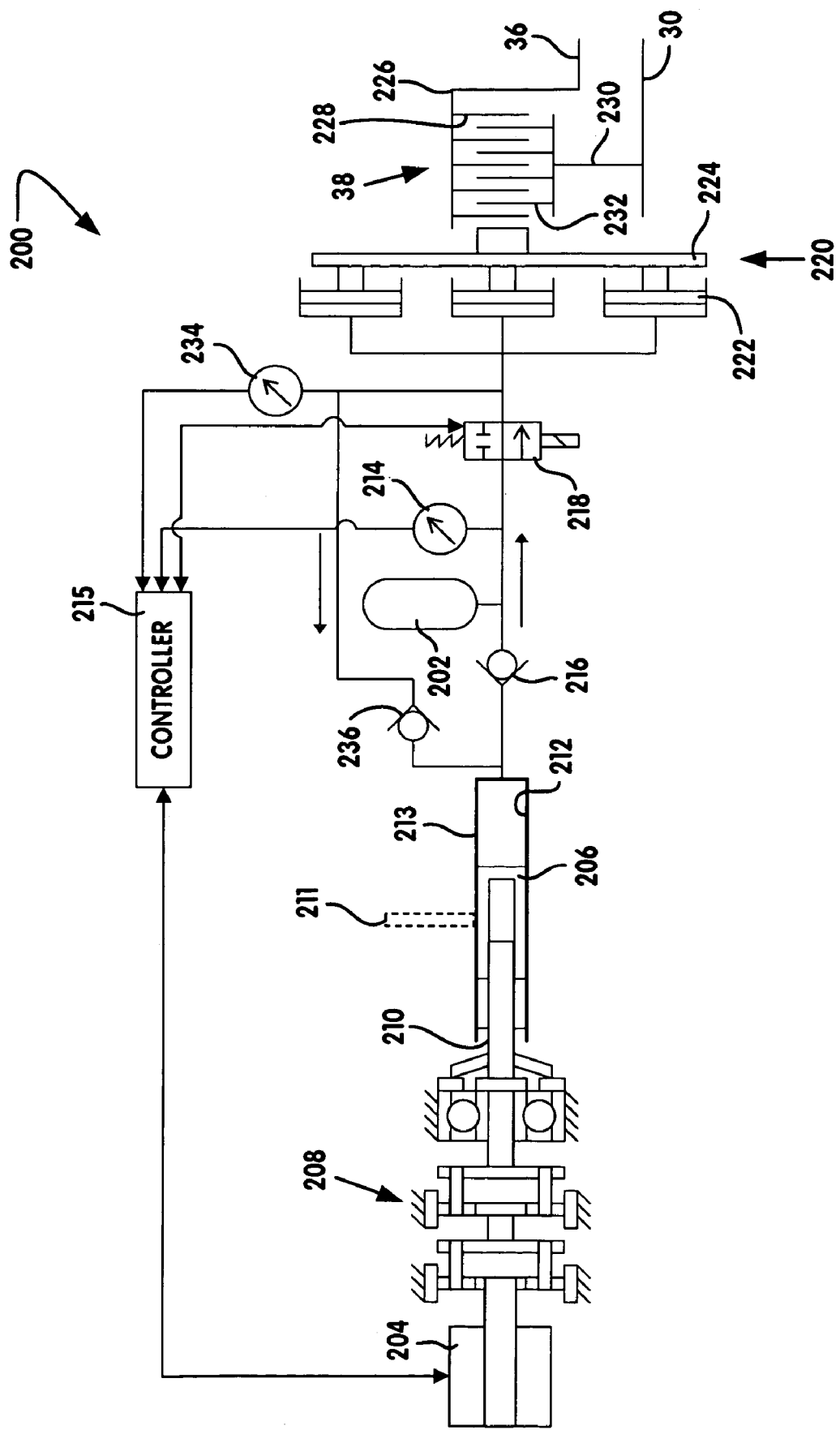
FIG. 2 is a schematic representation of a first embodiment clutch actuation system.

The first exemplary embodiment clutch control system 200 is depicted in FIG. 2. Clutch control system 200 includes an accumulator 202 as the energy storage device. Accumulator 202 may be of the gas or spring type. Clutch control system 200 also includes an electric motor 204, a piston 206, a gear reduction unit 208 and a lead screw 210. Electric motor 204 is drivingly coupled to gear reduction unit 208. The output from gear reduction unit 208 is engaged with lead screw 210. Operation of motor 204 causes lead screw 210 to rotate. Lead screw 210 is coupled to piston 206 such that rotation of lead screw 210 causes piston 206 to axially translate within a cavity 212 formed within a cylinder housing 213. An optional vent 211 extends from housing 213 to interconnect cavity 212 with a reservoir (not shown) containing additional fluid.

Clutch control system 200 also includes a first pressure sensor 214 in communication with accumulator 202. First pressure sensor 214 is operable to provide a signal indicative of the fluid pressure within accumulator 202 to a controller 215. It should be appreciated that controller 215 may be a stand alone unit or may be incorporated as part of controller 42. A non-returning check valve 216 is plumbed between cavity 212 and accumulator 202 to allow pressurized fluid to enter the accumulator but restrict flow from the accumulator toward the pressurized fluid source. A first control valve 218 is operable to selectively supply pressurized fluid within accumulator 202 to a clutch actuator assembly 220. Depending on system requirements, first control valve 218 may be a variable force solenoid, a pulse width modulation control valve, a proportional flow control valve or a proportional pressure control valve. Clutch actuator assembly 220 includes a plurality of slave pistons 222 substantially circumferentially spaced apart from one another and in communication with an apply plate 224.

Transfer clutch 38 is a multi-plate clutch assembly that is arranged to transfer torque between first output shaft 30 and second output shaft 36. Transfer clutch. 38 includes a cylindrical drum 226 shown to be operably fixed for rotation with second output shaft 36 and having a plurality of first or outer clutch plates 228 mounted (i.e., splined) for rotation with drum 226. A clutch hub 230 of transfer clutch 38 is fixed for rotation with first output shaft 30. A second set of clutch plates 232, referred to as inner clutch plates, are mounted (i.e., splined) for rotation with clutch hub 230. Torque is transferred between first output shaft 30 and second output shaft 36 by frictionally engaging first clutch plates 228 with second clutch plates 232 with a compression force supplied by apply plate 224.

Slave pistons 222 are slidably engageable with apply plate 224 and transmit a force proportional to the pressure acting on each of slave pistons 222. A second pressure sensor 234 is plumbed in communication with slave pistons 222. Second pressure sensor 234 is operable to output a signal indicative of the fluid pressure acting on slave pistons 222. The signal is provided to controller 215 and used as a feedback signal to control the torque generated by transfer clutch 38. A second non-returning check valve 236 acts as a pressure relief valve to allow fluid previously acting on slave pistons 222 to return to cavity 212. One skilled in the art will appreciate that clutch control system 200 is a closed hydraulic system. Accordingly, fluid need not be continually supplied to clutch control system 200 once the system has been initially filled with hydraulic fluid. An account for fluid leakage may be made as will be described.

In operation, electric motor 204 is rotated in a first direction to cause lead screw 210 to rotate thereby causing piston 206 to translate in an advancing direction. Pressurized fluid passes by non-returning check valve 216 and charges accumulator 202. Advancement of piston 206 continues until a desired pressure is reached as indicated by a signal output from first pressure sensor 214. The charging of accumulator 202 occurs over time such that peak currents need not be drawn from motor 204.

If a torque transfer between first output shaft 30 and second output shaft 36 is desired, first control valve 218 is operated to allow pressurized fluid from accumulator 202 to act on slave pistons 222. Slave pistons 222 axially translate to cause apply plate 224 to actuate transfer clutch 38 by clamping first clutch plates 228 to second clutch plates 232. If a reduction in torque is requested, motor 204 is operated in the reverse direction causing piston 206 to axially translate in a retracting direction. During retraction of piston 206, a pressure differential occurs across second non-returning check valve 236. To equalize the pressure on non-returning check valve 236, pressurized fluid previously acting on slave pistons 222 returns to cavity 212. At this time, a force transferred by apply plate 224 is reduced.

Figure 3:
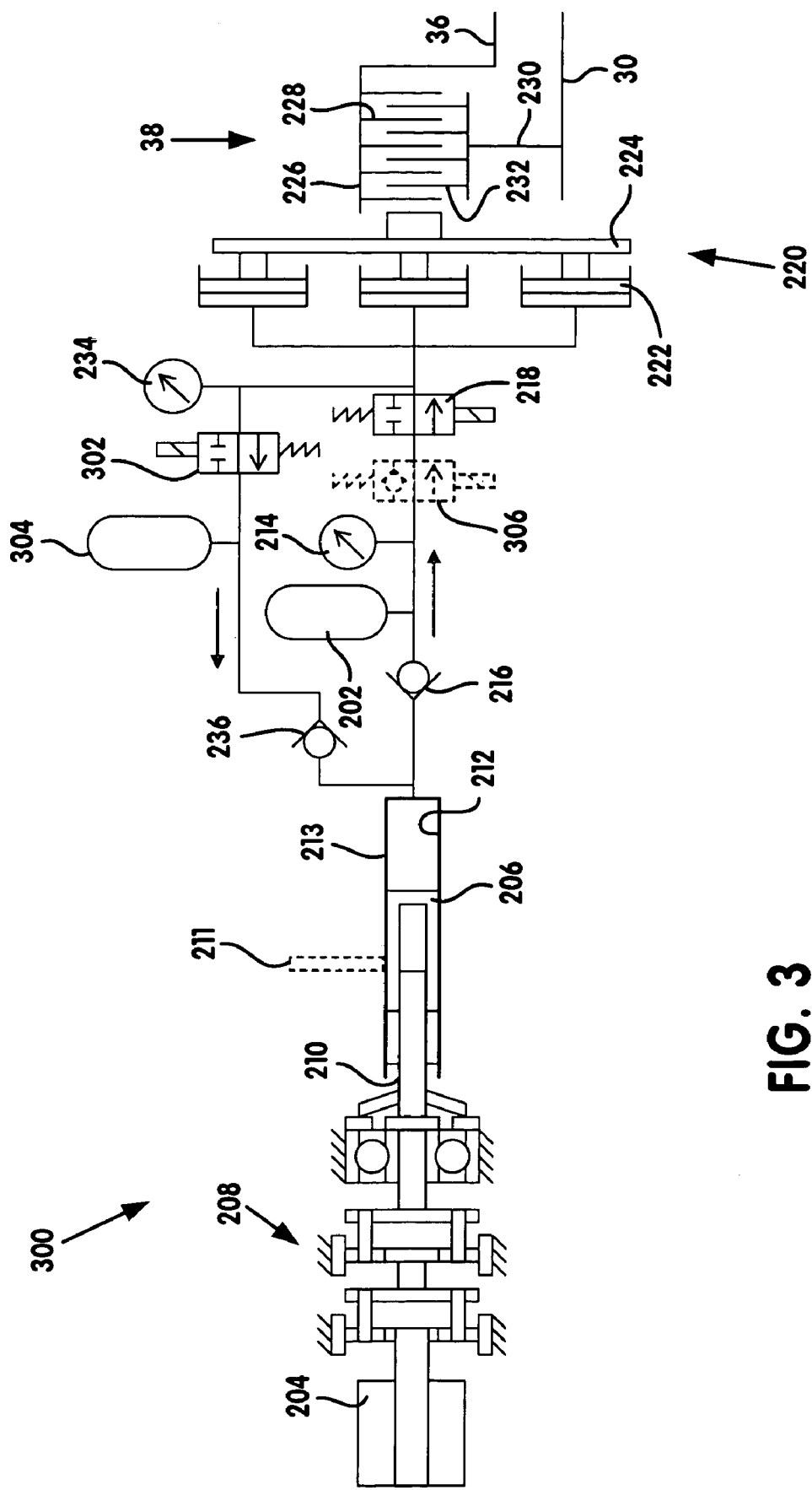
FIG. 3 is a schematic representation of an alternate embodiment clutch actuation system.

FIG. 3 depicts an alternate embodiment clutch control system 300. Clutch control system 300 is substantially similar to clutch control system 200 and like elements will retain their previously introduced reference numerals. For clarity, controller 215 is not shown but is included in clutch control system 300. Clutch control system 300 includes a second control valve 302 operable to selectively supply pressurized fluid acting on slave pistons 222 to a second accumulator 304. Second accumulator 304 contains fluid at a substantially lower pressure than accumulator 202. Pressure acting on slave pistons 222 may be selectively released to second accumulator 304 by actuating second control valve 302.

An optional third control valve 306 may be positioned between first control valve 218 and accumulator 202 if required. Use of third control valve 306 is contemplated for systems having a relatively high leakage rate between accumulator 202 and first control valve 218. Third control valve 306 includes a ball seat type arrangement to more completely contain pressurized fluid within accumulator 202. Third control valve 306 remains in the closed position until the accumulator has been charged to a desired pressure as indicated by first pressure sensor 214. Third control valve 306 acts as an on/off valve for providing pressurized fluid to first control valve 218.

In an alternate form, clutch control system 300 may be equipped with an alternate second control valve (not shown) that operates as a normally closed valve as opposed to the normally open configuration shown in FIG. 3. If second control valve 302 is a normally closed valve, leakage of fluid past first control valve 218 may cause transfer clutch 38 to be in an applied condition during vehicle inoperative times. Some Original Equipment Manufacturers may not wish this condition and specify the normally open second control valve. Furthermore, any number of the valves presently depicted may be plumbed as normally or normally closed valves to meet vehicle manufacturer requirements.

Figure 4:
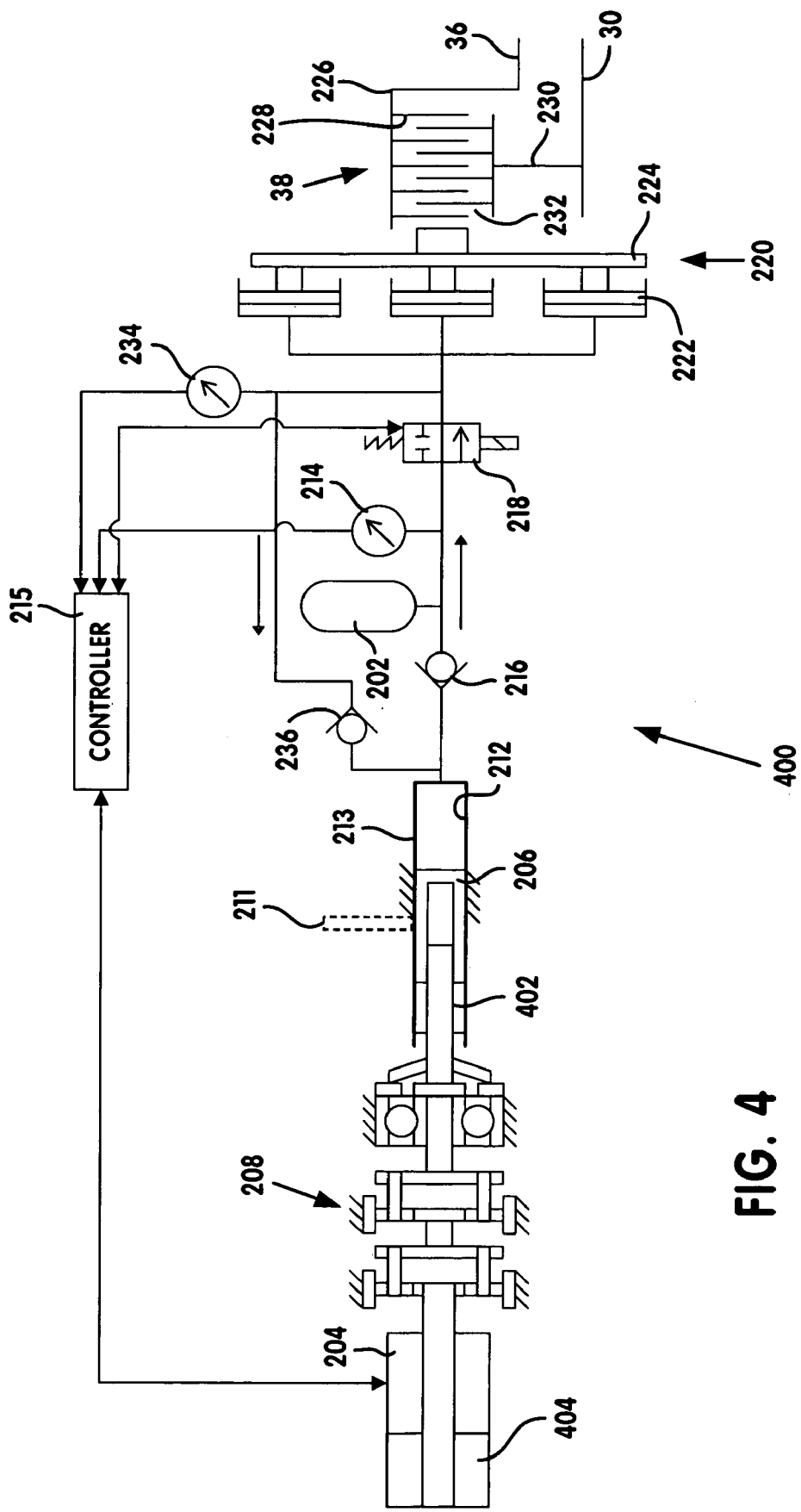
FIG. 4 is a schematic representation of an alternate embodiment clutch actuation system.

FIG. 4 depicts an alternate embodiment clutch control system 400. Clutch control system 400 is substantially similar to clutch control system 200 with the exception that lead screw 210 is replaced by a ball screw 402. Rotation of motor 204 causes ball screw 402 to rotate and translate piston 206. Because the piston to ball screw interconnection is a very low friction overrunning interface, a brake 404 is coupled to motor 204 to selectively restrict rotation of ball screw 402. Brake 404 is operable to maintain a desired pressure acting on slave pistons 222 by selectively restricting or allowing pressurized fluid to pass by a second non-returning check valve. Specifically, if brake 404 is applied, piston 206 will not be allowed to move in the retracting direction and additional fluid will not be allowed to enter cavity 212. When brake 404 is released, a pressure differential across second non-returning check valve 236 will result in piston 206 being driven in the retracting direction until the pressure differential is minimized. During this fluid transfer, the torque generated by transfer clutch 38 will be reduced.

Figure 5:
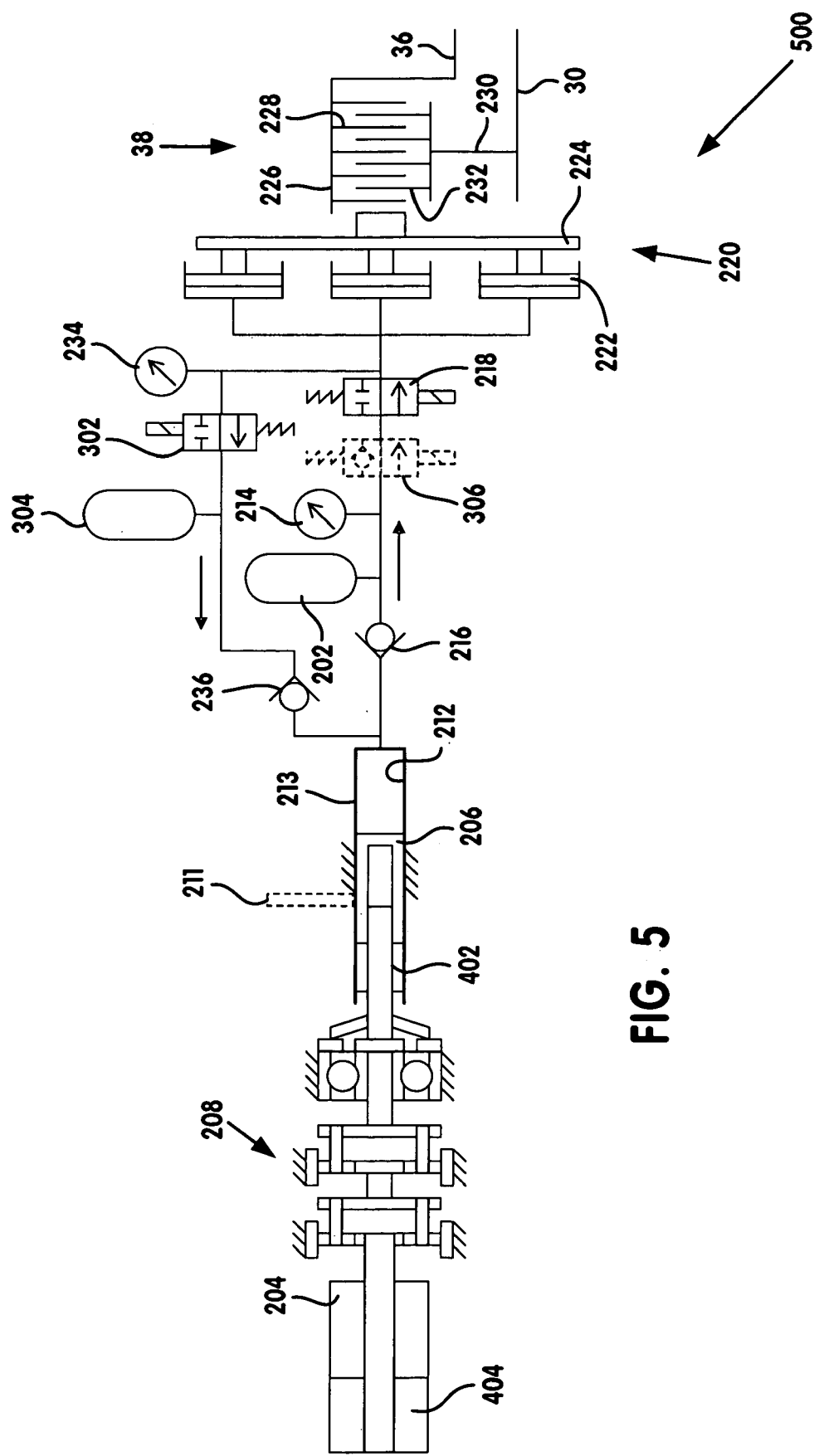
FIG. 5 is a schematic representation of an alternate embodiment clutch actuation system.

FIG. 5 depicts another alternate embodiment clutch control system identified at reference numeral 500. Clutch control system 500 combines the features of clutch control system 400 and clutch control system 300. For clarity, previously introduced like elements will retain their reference numerals. Specifically, clutch control system 500 is substantially identical to clutch control system 300 except lead screw 210 has been replaced by ball screw 402. Brake 404 has been added to perform the functions previously described.

Figure 6:
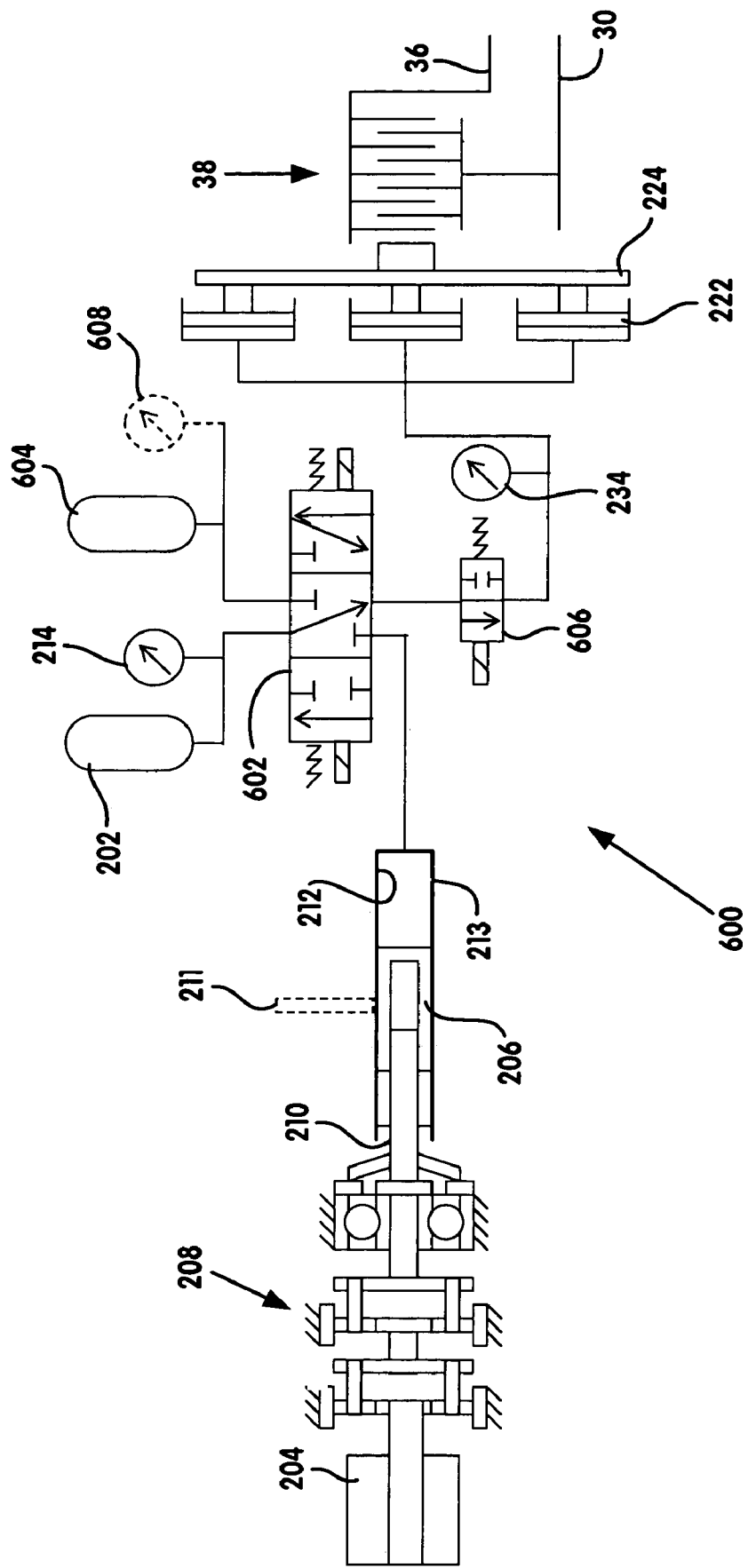
FIG. 6 is a schematic representation of an alternate embodiment clutch actuation system.

FIG. 6 depicts an alternate embodiment clutch control system 600. Clutch control system 600 includes many elements substantially similar to those previously described in relation to clutch control system 200. Like elements will retain their previously introduced reference numerals. Clutch control system 600 includes a first control valve 602 in communication with accumulator 202, a second accumulator 604, and a second control valve 606. First control valve 602 is a three position valve. In the first position, cavity 212 and housing 213 are in fluid communication with accumulator 202. When first control valve 602 is in a second position, cavity 212 is blocked and pressurized fluid from accumulator 202 is in communication with second control valve 606. At a third position of first control valve 602, pressurized fluid is trapped within accumulator 202 and the pathway interconnecting cavity 212, second accumulator 604 and second control valve 606 is opened. A third pressure sensor 608 outputs a signal indicative of the pressure within second accumulator 604.

In operation, lead screw 210 and piston 206 will act as a reciprocating piston pump under power of motor 204. Fluid is drawn into cavity 212 during retraction of piston 206 when first control valve 602 is in the third position. First control valve 602 is moved to the first position and motor 204 drives piston 206 in the advancing direction to push fluid through first control valve 602 and pressurize accumulator 202. This procedure is continued until a desired pressure is measured by first pressure sensor 214. Once accumulator 202 is charged, pressurized fluid may be released to second control valve 606 by positioning first control valve 602 in the second position. Depending on the system requirements, second control valve 606 may be a variable force solenoid, a pulse width modulation control valve, proportional flow control valve or a proportional pressure control valve. Second control valve 606 is selectively operable to release pressurized fluid to act on slave pistons 222. Second pressure sensor 234 provides a signal indicative of the fluid pressure acting on the slave pistons. To release pressure acting on slave pistons 222 and reduce the torque generated by transfer clutch 38, second control valve 606 is opened and first control valve is placed in its third position to allow fluid to return to second accumulator 604 and/or cavity 212.

Figure 7:
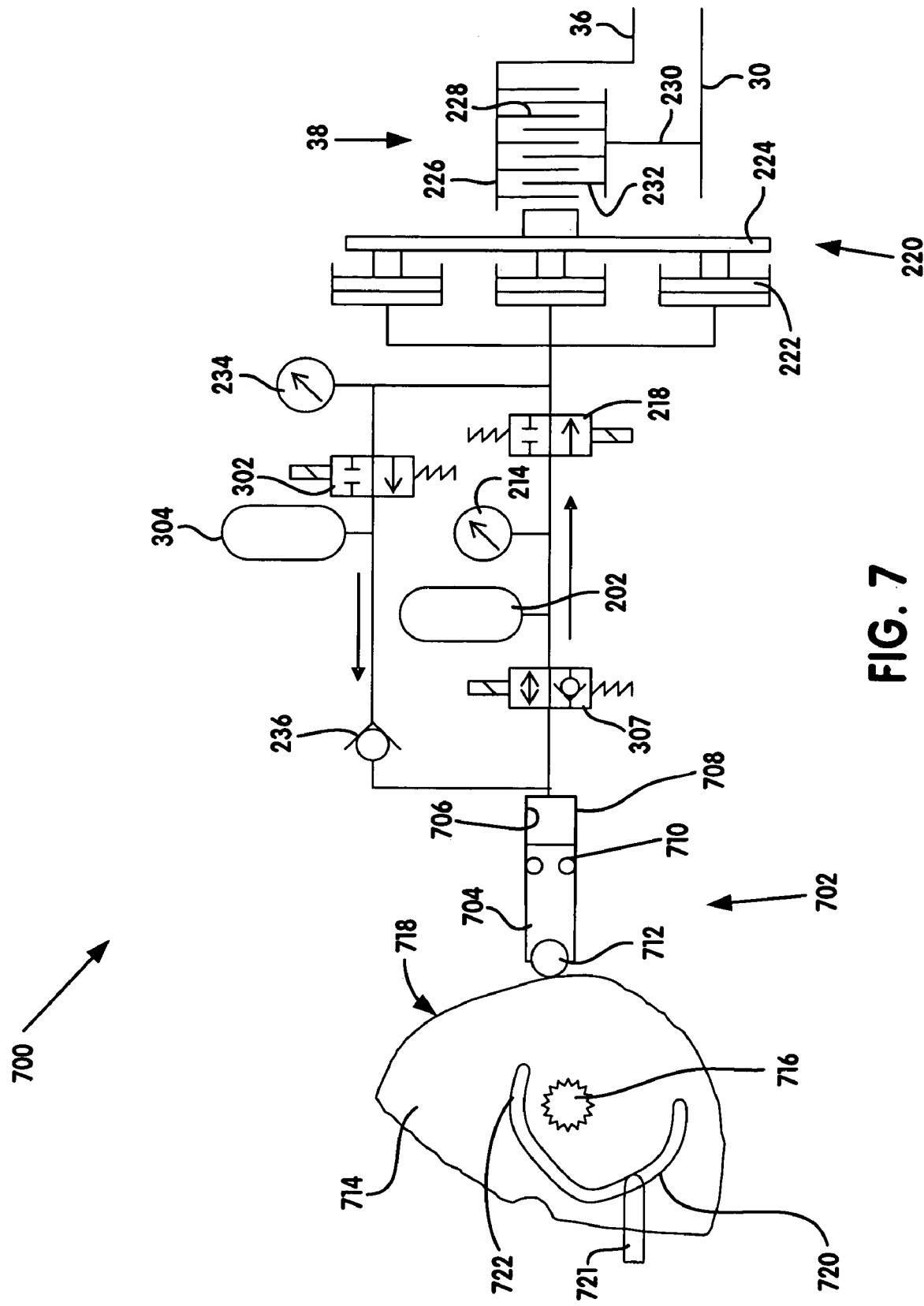
FIG. 7 is a schematic representation of an alternate embodiment clutch. actuation system.

FIG. 7 shows another alternate embodiment clutch control system identified by reference numeral 700. Clutch control system 700 includes many elements substantially similar to those previously described in relation to clutch control system 300. As such, like elements will retain their previously introduced reference numerals. Clutch control system 700 includes a hydraulic actuator 702 selectively operable to provide pressurized fluid to high pressure accumulator 202. Hydraulic actuator 702 includes a master piston 704 slidably positioned within a cavity 706 of a housing 708. A seal 710 sealingly engages master piston 704 and housing 708 to maintain a closed hydraulic system. A roller 712 is rotatably coupled to master piston 704.

A sector gear 714 includes a splined aperture 716, a cam surface 718 and a range slot 720. Cam surface 718 is positioned relative to the axis of rotation of sector gear 714 such that rotation of the sector gear causes master piston 704 to translate within housing 708. Preferably, cam surface 718 is shaped to translate master piston 704 from a retracted position shown in FIG. 7 to an advanced position (not shown) during oscillation of sector gear 714.

Range slot 720 is configured to accept a member 721 for shifting the present gear range on a torque transfer mechanism. Range slot 720 includes at least one dwell portion 722 where oscillation of sector gear 714 may occur without radially translating the member disposed within range slot 720. This configuration allows operation of hydraulic actuator 702 without causing a range shift. In the preferred embodiment, sector gear 714 is a component of a two-speed transfer case. The member disposed within range slot 720 is operable to cause a change in the gear reduction from low to high or vice versa during operation of the vehicle.

A third control valve 724 is plumbed in place of non-returning valve 216 between accumulator 202 and cavity 706. Third control valve 724 includes a non-returning check valve position and a flow through position. During normal operation, the third control valve 724 is biased toward the check valve position and operates as previously described. However, third control valve 724 may selectively be shifted to allow highly pressurized fluid contained within accumulator 202 to act upon piston 704. At this time, roller 712 applies a force to sector gear 714 to assist in a range shift operation if so desirable. Specifically, rotation of sector gear 714 will cause member 721 to radially translate and change the gear position within a torque transfer mechanism to which it is connected.

Figure 9:
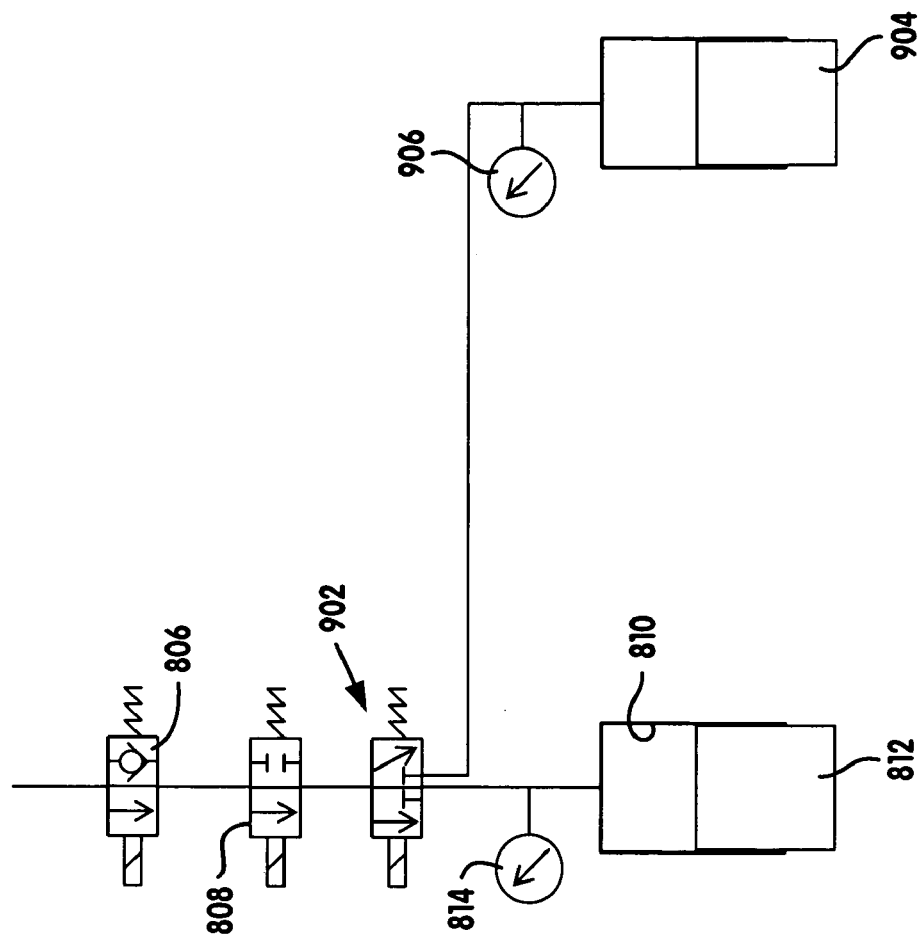
FIG. 9 is a schematic representation of an alternate optional hydraulic subsystem for use with the clutch actuation systems of FIGS. 1–7.
Figure 8:
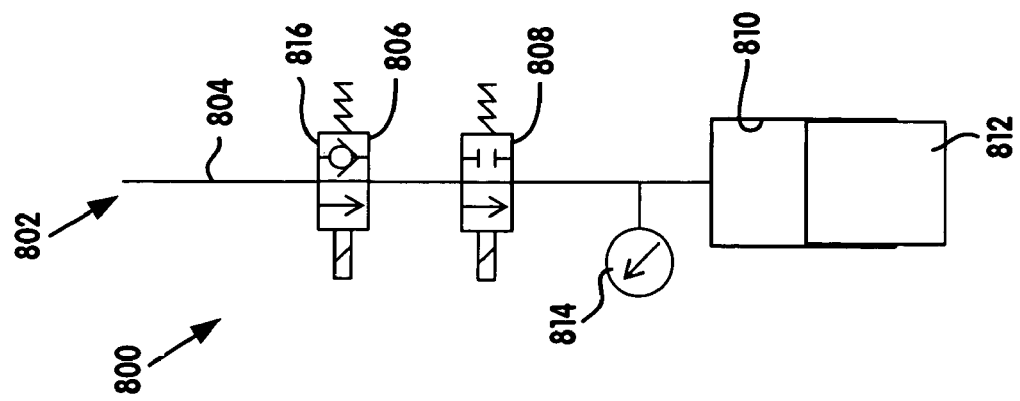
FIG. 8 is a schematic representation of an optional hydraulic subsystem for use with the clutch actuation systems of FIGS. 1–7.
Figure 10:
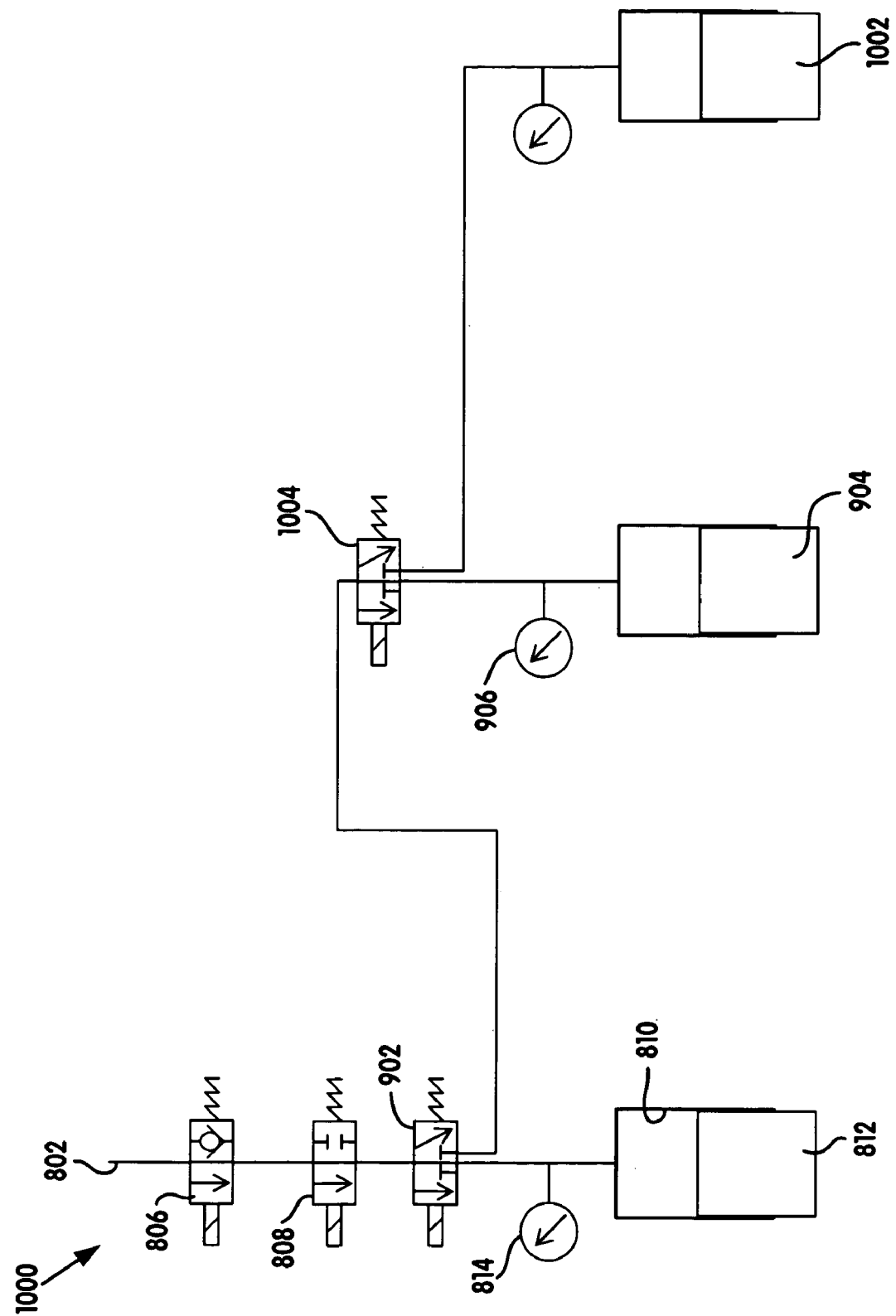
FIG. 10 is a schematic representation of an alternate optional hydraulic subsystem for use with the clutch actuation systems of FIGS. 1–7.

FIGS. 8 through 10 depict circuit options that may be used with any of the clutch control systems previously described. These circuit options provide another degree of flexibility for controlling additional clutch packs, range sleeves, range forks or any other hydraulically actuated device on the vehicle.

FIG. 8 shows a hydraulic circuit branch 800 having an end 802 that is tapped into a clutch control system immediately adjacent the high pressure accumulator. As such, highly pressurized fluid is present in a line 804. An optional on/off solenoid 806 is plumbed in series with a control valve 808. On/off solenoid 806 and control valve 808 are selectively operable to allow pressurized fluid to enter a cavity 810 containing a piston 812. A pressure sensor 814 provides a signal indicative of the pressure acting on piston 812. Piston 812 may provide actuation force to any number of devices as previously described. Depending on the system to be energized, control valve 808 may be the only valve between the high pressure accumulator and piston 812. Alternatively, if concerns arise regarding leakage of highly pressurized fluid into cavity 810, optional on/off solenoid 806 includes a non-returning check valve position 816 to limit ingress of fluid.

FIG. 9 depicts a circuit branch 900 substantially similar to circuit branch 800. Accordingly, like numerals will be used to identify previously introduced elements. Circuit branch 900 includes an additional control valve 902 operable to selectively supply pressurized fluid to piston 812 or a second piston 904. A second pressure sensor 906 provides a signal indicative of the pressure acting on piston 904 to the controller (not shown).

FIG. 10 depicts another optional circuit branch 1000. Circuit branch 1000 is a variant of circuit branches 800 and 900. As such, like elements will retain their previously introduced reference numerals. Circuit branch 1000 includes a third piston 1002 in selective communication with highly pressurized fluid from the high pressure accumulator. An additional control valve 1004 is operable to direct pressurized fluid to piston 904 or piston 1002 as is required. One skilled in the art will appreciate that any number of variations of circuit branches 800, 900 and 1000 may be constructed to provide application force to additional mechanisms.

Figure 11:
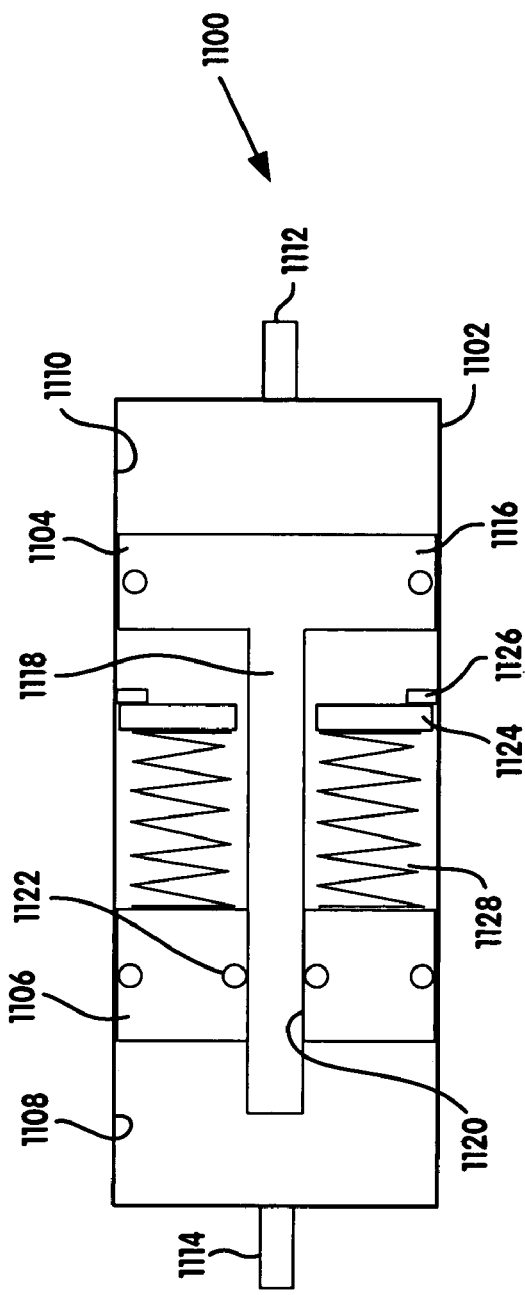
FIG. 11 is a schematic representation of a combined pressure accumulator of the present invention.
Figure 12:
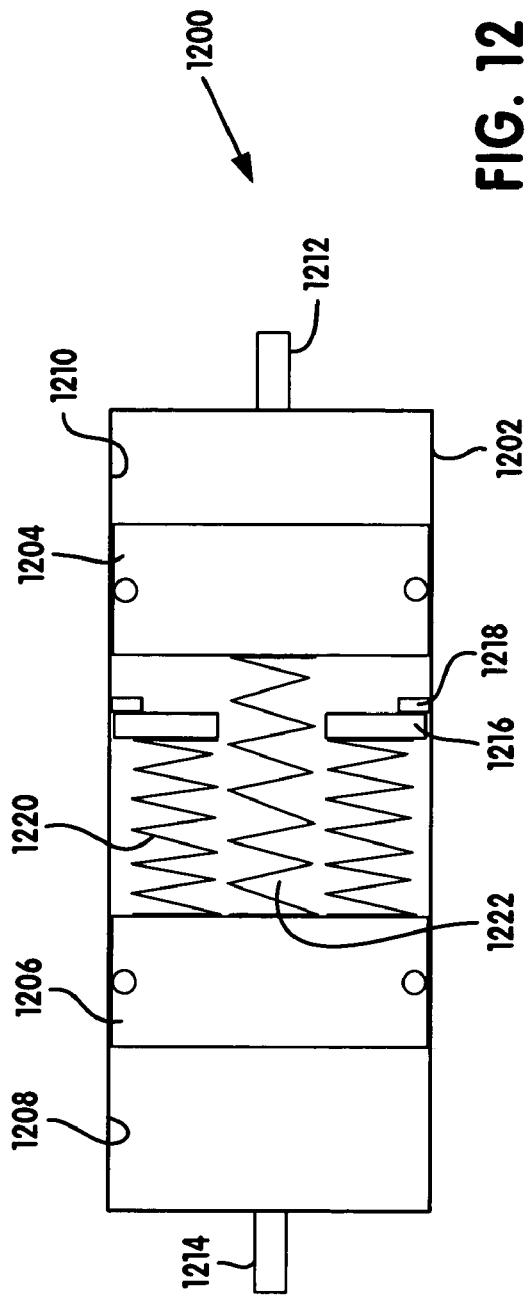
FIG. 12 is a schematic representation of an alternate combined pressure accumulator.

FIGS. 11 and 12 show combined accumulators each having a low pressure side and high pressure side. A combined accumulator may replace the accumulators previously described. FIG. 11 shows a combined accumulator 1100 including a housing 1102 having a low pressure piston 1104 and a high pressure piston 1106 slidably positioned therein. Housing 1102 and high pressure piston 1106 define a high pressure cavity 1108. Housing 1102 and low pressure piston 1104 define a low pressure cavity 1110. A first port 1112 is in communication with low pressure cavity 1110. A second port 1114 is in communication with high pressure cavity 1108. Low pressure piston 1104 includes a body portion 1116 and a push rod 1118. Push rod 1118 extends through an aperture 1120 extending through high pressure piston 1106. A seal 1122 engages push rod 1118 and high pressure piston 1106. A plate 1124 and snap ring 1126 are arranged within housing 1102 between high pressure piston 1106 and body portion 1116 of low pressure piston 1104. A spring 1128 biases high pressure piston 1106 away from plate 1124.

Combined accumulator 1100 provides storage of highly pressurized fluid in high pressure cavity 1108 and storage capacity for low pressure fluid in low pressure cavity 1110. It should be appreciated that only one spring is required within combined accumulator 1100. Furthermore, a small increase of pressure will occur within high pressure cavity 1108 when pressure is added to low pressure cavity 1110. This occurs due to movement of push rod 1118 within high pressure cavity 1108.

FIG. 12 depicts an alternate embodiment combined accumulator 1200 that includes a housing 1202 having a low pressure piston 1204 and a high pressure piston 1206 slidably disposed within housing 1202. Housing 1202 and high pressure piston 1206 define a high pressure cavity 1208. Housing 1202 and low pressure piston 1204 define a low pressure cavity 1210. A first port 1212 is in communication with low pressure cavity 1210. A second port 1214 is in communication with high pressure cavity 1208. A plate 1216 is positioned within housing 1202 between high pressure piston 1206 and low pressure piston 1204. A snap ring 1218 restricts plate 1216 from moving toward low pressure piston 1204. A first spring 1220 is positioned between plate 1216 and high pressure piston 1206. First spring 1220 biases high pressure piston 1206 away from plate 1216. A second spring 1222 interconnects high pressure piston 1206 and low pressure piston 1204. Combined accumulator 1200 is a space saving accumulator because only one housing is required for both a high pressure and a low pressure accumulator. Furthermore, combined accumulator 1200 functions such that an increase in pressure within low pressure cavity 1210 causes an increase in pressure within high pressure cavity 1208 due to second spring 1222.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A power transmission device comprising:
   a rotary input member adapted to receive drive torque from a source of torque;
   a rotary output member adapted to provide drive torque to an output device; and
   a torque transfer mechanism operable for transferring drive torque from said input member to said output member, said torque transfer mechanism including a friction clutch assembly operably disposed between said input member and said output member and a hydraulic clutch actuation system operable for applying a clutch engagement force to said friction clutch assembly, said hydraulic clutch actuation system including an electric motor drivingly coupled to a first piston, said first piston being slidably positioned within a housing for supplying pressurized fluid to an accumulator, said pressurized fluid within said accumulator being in selective fluid communication with a second piston, wherein supply of said pressurized fluid to said second piston provides said clutch engagement force, said hydraulic clutch actuation system further including a controller, a pressure sensor operable to provide said controller a signal indicative of a fluid pressure within said pressure chamber, and a second pressure sensor operable to provide said controller a signal indicative of a pressure of fluid within said accumulator.

2. The power transmission of claim 1 wherein said hydraulic clutch actuation system includes a first valve for selectively fluidly coupling said accumulator to said second piston.

3. The power transmission of claim 2 wherein said hydraulic clutch actuation system includes a first check valve, said first check valve being operable to allow pressurized fluid to enter said accumulator driven by said first piston and restrict fluid flow from said accumulator toward said first piston.

4. The power transmission of claim 3 wherein said hydraulic clutch actuation system includes an exhaust valve for selectively coupling a pressure chamber containing said second piston and said first piston, said exhaust valve being operable to release pressure in said pressure chamber, thereby reducing said clutch engaging force on said friction assembly.

5. The power transmission of claim 4 wherein said controller is operable to actuate said first valve and said exhaust valve to maintain a desired pressure within said pressure chamber.

6. The power transmission of claim 1 wherein said controller is operable to control the operation of said electric motor to maintain said pressure within said accumulator within a desired range.

7. The power transmission of claim 1 further including a rotatable screw drivingly coupled to said electric motor, said first piston being coupled to said screw and operable to translate in response to rotation of said screw.

8. The power transmission of claim 7 wherein said screw may not be rotated by applying force to said first piston.

9. The power transmission device of claim 1 wherein said input member is a first output shaft of a transfer case and said output member is a second output shaft of said transfer case.

10. The power transmission of claim 1 wherein said input member is driven by a power train of a motor vehicle and said output member is connected to a differential of an axle assembly.

11. The power transmission device of claim 1 wherein said friction clutch assembly includes an interleaved clutch pack having a first set of clutch plates fixed for rotation with said input member and a second set of clutch plates fixed for rotation with said output member, and a pressure plate, and wherein axial movement of said second piston causes said pressure plate to apply said clutch engagement force on said clutch pack.

12. The power transmission of claim 1 wherein said controller is operable to establish the value of an electric control signal based on a rotary speed difference between said input member and said output member, and wherein said control signal is operable to vary the pressure supplied to said second piston for causing torque to be transferred by said friction clutch assembly.

13. A power transmission device comprising:
   a rotary input member adapted to receive drive torque from a source of torque;
   a rotary output member adapted to provide drive torque to an output device; and
   a torque transfer mechanism operable for transferring drive torque from said input member to said output member, said torque transfer mechanism including a friction clutch assembly operably disposed between said input member and said output member and a hydraulic clutch actuation system operable for applying a clutch engagement force to said friction clutch assembly said hydraulic clutch actuation system including an electric motor drivingly coupled to a first piston, said first piston being slidably positioned within a housing for supplying pressurized fluid to an accumulator, said pressurized fluid within said accumulator being in selective fluid communication with a second piston, wherein supply of said pressurized fluid to said second piston provides said clutch engagement force, and wherein said hydraulic clutch actuation system includes a first check valve, said first check valve being operable to allow pressurized fluid to enter said accumulator driven by said first piston and restrict fluid flow from said accumulator toward said first piston, said hydraulic clutch actuation system further including a second check valve allowing fluid flow from said second piston toward said first piston and restricting flow in the reverse direction.

14. A power transmission device comprising:
a rotary input member adapted to receive drive torque from a source of torque;
a rotary output member adapted to provide drive torque to an output device; and
a torque transfer mechanism operable for transferring drive torque from said input member to said output member, said torque transfer mechanism including a friction clutch assembly operably disposed between said input member and said output member and a hydraulic clutch actuation system operable for applying a clutch engagement force to said friction clutch assembly, said hydraulic clutch actuation system including an electric motor drivingly coupled to a first piston, said first piston being slidably positioned within a housing for supplying pressurized fluid to an accumulator, said pressurized fluid within said accumulator being in selective fluid communication with a second piston, wherein supply of said pressurized fluid to said second piston provides said clutch engagement force, further including a second accumulator plumbed between an exhaust valve and said first piston, said exhaust valve being operable to provide pressurized fluid from said second piston to said second accumulator, said pressurized fluid within said second accumulator supplying said housing with fluid during a retraction stroke of said first piston.

15. A power transmission device comprising:
a rotary input member adapted to receive drive torque from a source of torque;
a rotary output member adapted to provide drive torque to an output device; and
a torque transfer mechanism operable for transferring drive torque from said input member to said output member, said torque transfer mechanism including a friction clutch assembly operably disposed between said input member and said output member and a hydraulic clutch actuation system operable for applying a clutch engagement force to said friction clutch assembly, said hydraulic clutch actuation system including an actuator driving a piston, said piston being slidably positioned within a housing for supplying pressurized fluid to an accumulator, said pressurized fluid within said accumulator being selectively operable to provide said clutch engagement force, wherein said accumulator includes a high pressure piston and a low pressure piston slidably positioned within another housing, said accumulator including a push rod fixed to said low pressure piston and extending through an aperture formed in said high pressure piston, and wherein a pressure increase on said low pressure piston operates to increase pressure acting on said high pressure piston.

16. The power transmission of claim 15 wherein said hydraulic clutch actuation system includes a first valve for selectively fluidly coupling said accumulator to another piston operable to apply said clutch engagement force.

17. The power transmission of claim 15 wherein said accumulator includes a spring acting on said high pressure piston and said another housing.

18. A power transmission device comprising:
a rotary input member adapted to receive drive torque from a source of torque;
a rotary output member adapted to provide drive torque to an output device; and
a torque transfer mechanism operable for transferring drive torque from said input member to said output member, said torque transfer mechanism including a friction clutch assembly operably disposed between said input member and said output member and a hydraulic clutch actuation system operable for applying a clutch engagement force to said friction clutch assembly, said hydraulic clutch actuation system including an actuator driving a piston, said piston being slidably positioned within a housing for supplying pressurized fluid to an accumulator, said pressurized fluid within said accumulator being selectively operable to provide said clutch engagement force, wherein said hydraulic clutch actuation system includes a first valve for selectively fluidly coupling said accumulator to another piston operable to apply said clutch engagement force, and wherein said hydraulic clutch actuation system includes an exhaust valve in communication with a pressure chamber containing said another piston, said exhaust valve being operable to release pressure in said pressure chamber, thereby reducing said clutch engaging force on said friction assembly.

19. The power transmission of claim 18 further including a controller and a pressure sensor operable to provide said controller a signal indicative of a fluid pressure within said pressure chamber.

20. A power transmission device comprising:
a rotary input member adapted to receive drive torque from a source of torque;
a rotary output member adapted to provide drive torque to an output device; and
a torque transfer mechanism operable for transferring drive torque from said input member to said output member, said torque transfer mechanism including a friction clutch assembly operably disposed between said input member and said output member and a hydraulic clutch actuation system operable for applying a clutch engagement force to said friction clutch assembly, said hydraulic clutch actuation system including an actuator driving a piston, said piston being slidably positioned within a housing for supplying pressurized fluid to an accumulator, said pressurized fluid within said accumulator being selectively operable to provide said clutch engagement force, wherein said hydraulic clutch actuation system includes a solenoid operated shut off valve and a control valve positioned between said accumulator and first and second output pistons, said control valve being operable to selectively supply pressurized fluid to said first and second output pistons individually.

* * * * *